United States Patent
Oouchida (10) Patent No.: US 7,881,178 B2
(45) Date of Patent: Feb. 1, 2011

(54) OPTICAL INFORMATION RECORDING MEDIUM, OPTICAL INFORMATION RECORDING/REPRODUCING SYSTEM, AND OPTICAL INFORMATION RECORDING/REPRODUCING APPARATUS

(75) Inventor: Shigeru Oouchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 875 days.

(21) Appl. No.: 11/819,745

(22) Filed: Jun. 28, 2007

(65) Prior Publication Data

US 2008/0013441 A1    Jan. 17, 2008

(30) Foreign Application Priority Data

Jul. 11, 2006  (JP)  ............... 2006-190560

(51) Int. Cl.
*G11B 7/24*    (2006.01)
(52) U.S. Cl. ............... 369/275.4; 369/275.3; 369/286; 369/94

(58) Field of Classification Search .............. 369/275.3, 369/275.4, 286, 47.53, 53.2, 94
See application file for complete search history.

(56) References Cited

U.S. PATENT DOCUMENTS

| 6,738,322 B2* | 5/2004 | Amble et al. ............ 369/44.27 |
| 6,934,243 B2* | 8/2005 | Akiyama et al. ......... 369/275.3 |
| 7,403,457 B2* | 7/2008 | Ogawa et al. ........... 369/47.53 |
| 2008/0165652 A1* | 7/2008 | Misawa et al. ................ 369/94 |

FOREIGN PATENT DOCUMENTS

| JP | 6-28672 A | 2/1994 |
| JP | 2002-312958 A | 10/2002 |
| JP | 2004-79121 A | 3/2004 |
| JP | 2005-018852 A | 1/2005 |

* cited by examiner

*Primary Examiner*—Ali Neyzari
(74) *Attorney, Agent, or Firm*—Dickstein Shapiro LLP (57) ABSTRACT

A disclosed optical information recording medium includes a guide track layer having grooves and ridges; and recording layers composed of an optical recording material and disposed above and below the guide track layer. The guide track layer is used to determine track positions on the recording layers.

9 Claims, 9 Drawing Sheets

OPTICAL INFORMATION RECORDING MEDIUM, OPTICAL INFORMATION RECORDING/REPRODUCING SYSTEM, AND OPTICAL INFORMATION RECORDING/REPRODUCING APPARATUS

BACKGROUND OF THE INVENTION

1. Field of the Invention

The present invention generally relates to an optical information recording medium, an optical information recording/reproducing system, and an optical information recording/reproducing apparatus.

2. Description of the Related Art

In recent years, with the development of digital technologies and the improvement in data compression techniques, optical disks such as a digital versatile disk (DVD) have gotten a lot of attention as media for recording information such as music, movies, photographs, and computer programs. Also, as the prices of optical disks become lower, optical drives for recording and/or reproducing information on optical disks have become widespread.

Meanwhile, the data sizes of contents are increasing year by year and there is an increasing demand for optical disks with higher storage capacity. One way to increase the storage capacity of an optical disk is to provide multiple recording layers. Currently, development of optical disks having multiple recording layers (hereafter, may also be called "multilayer disks" or "multilayer optical disks") and optical drives for recording and/or reproducing information on such multilayer disks is very active.

However, if the number of recording layers in a conventional optical disk is increased, the amount of light reflected from a recording layer decreases as the distance between the recording layer and the incidence plane increases, because light is absorbed by other recording layers. If the amount of light reflected from a distant recording layer decreases much, it becomes difficult to detect a signal. Also, a conventional laser diode may not be powerful enough to record information on such a multilayer optical disk. These problems have been limiting the number of recording layers in an optical disk.

To solve the above problems and thereby to increase the number of recording layers, multilayer disks using two-photon absorption materials have been proposed. The refractive index of a two-photon absorption material changes when it absorbs two photons simultaneously. The proposed multilayer disks utilize this characteristic of two-photon absorption materials. On a multilayer disk composed of a two-photon absorption material, information is recorded by changing the refractive index of target areas. These refractive index changed areas are called pits. More specifically, information is represented by the lengths and combination of refractive index changed areas and refractive index unchanged areas.

The probability of occurrence of two-photon absorption is proportional to the square of an applied optical-electric field (intensity of incident light). Therefore, two-photon absorption occurs only in an area where the energy of incident light is concentrated. When incident light is focused by a lens, two-photon absorption occurs only around the focal point and does not occur in other areas where the incident light is not focused. In other words, the refractive indices of recording layers away from the focal point do not change and those recording layers transmit the incident light without changing its intensity. Therefore, if a two-photon absorption material is used for recording layers, increasing the number of recording layers does not make it difficult to detect a signal or cause recording power shortage problems.

Thus, using two-photon absorption materials makes it possible to increase the number of recording layers and thereby to greatly increase the storage capacity of an optical disk. However, as in the case of conventional multilayer disks, forming guide tracks on each of the recording layers results in increased costs.

To obviate this problem, multilayer disks having guide tracks on a layer(s) other than recording layers have been proposed (see, for example, patent documents 1 and 2).

[Patent document 1] Japanese Patent Application Publication No. 2002-312958

[Patent document 2] Japanese Patent Application Publication No. 2005-18852

Patent document 1 discloses a recording medium where recording layers are provided only on one side of a guide track layer. Accordingly, in the disclosed recording medium, some of the recording layers are distant from the guide track layer. Also, with the disclosed configuration, since servo control is performed by detecting reflected light from the guide track layer, if the recording medium is tilted in the radial direction in relation to the incidence angle of light, a tracking error may occur on a recording layer that is distant from the guide track layer. For example, on a recording layer that is 1 mm distant from the guide track layer, when the recording medium is tilted 1 degree in relation to the incidence angle of the light, the focal point of the light is shifted as much as 17.4 μm. On a Blu-ray disk with a track pitch of 0.32 μm, 17.4 μm is equivalent to about 50 tracks. For this reason, the recording medium disclosed in patent document 1 requires a high-precision tilt control mechanism when the number of recording layers is large.

Patent document 2 discloses an optical information recording medium where a first guide track layer and a second guide track layer are provided, respectively, above and below a set of recording layers for effective tilt control. The first and second guide track layers have alternate grooves and ridges and the grooves and ridges of the first and second guide track layers are aligned. One disadvantage of the disclosed technology is that it is very difficult to accurately align the grooves and ridges of the first and second layers. In other words, it is very difficult to actually produce the disclosed optical information recording medium.

SUMMARY OF THE INVENTION

The present invention provides an optical information recording medium, an optical information recording/reproducing system, and an optical information recording/reproducing apparatus that substantially obviate one or more problems caused by the limitations and disadvantages of the related art.

According to an embodiment of the present invention, an optical information recording medium includes a guide track layer having grooves and ridges formed thereon; and recording layers composed of an optical recording material and disposed above and below the guide track layer; wherein the guide track layer is used to determine track positions on the recording layers.

DESCRIPTION OF THE PREFERRED EMBODIMENTS

Preferred embodiments of the present invention are described below with reference to the accompanying drawings.

First Embodiment

Figure 1:
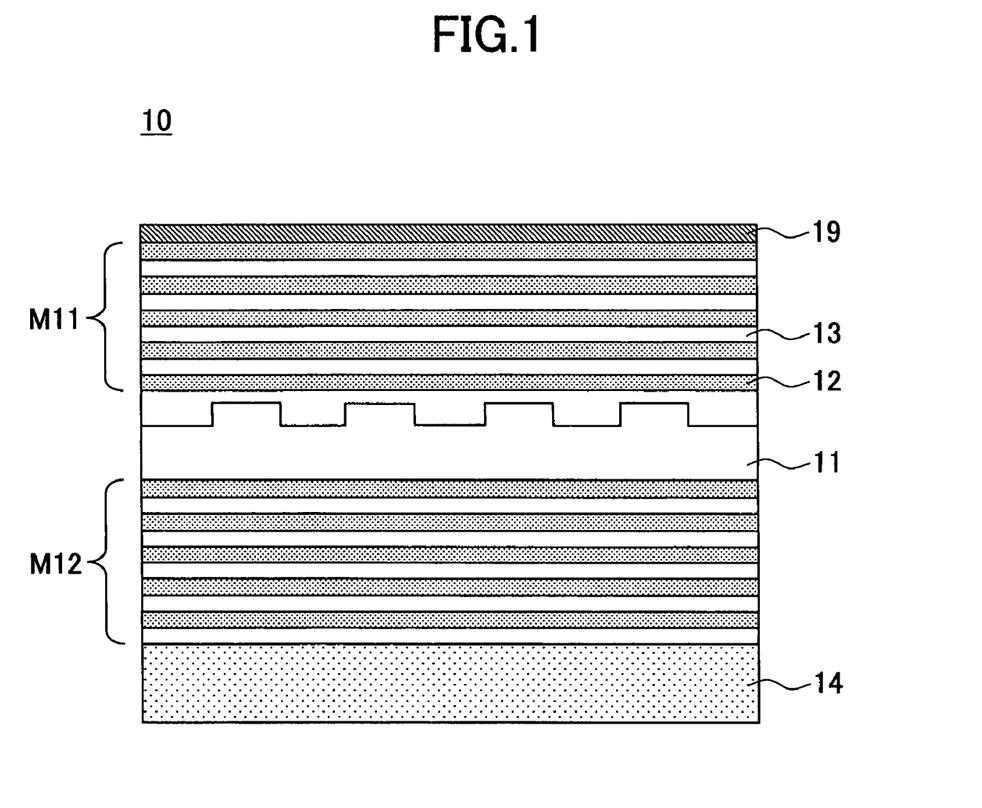
FIG. 1 is a cut-away side view of an optical information recording medium according to a first embodiment of the present invention.

FIG. 1 is a cut-away side view of an optical information recording medium according to a first embodiment of the present invention.

As shown in FIG. 1, an optical information recording medium 10 includes a guide track layer 11 that is a servo layer, recording layers 12 that are data layers, resin layers 13 that are gap layers, a cover layer 14, and a substrate layer 19.

The guide track layer 11 has alternate grooves and ridges extending in the circumferential direction (when the optical information recording medium 10 has a circular shape) and used to determine track positions in the optical information recording medium 10.

The recording layers 12 and the resin layers 13 are stacked alternately above and below the guide track layer 11. In FIG. 1, five recording layers 12 and four/five resin layers 13 are alternately stacked both above and below the guide track layer 11. The numbers of the recording layers 12 and the resin layers 13 are not limited to those shown in FIG. 1. The recording layers 12 are composed of an optical recording material that is described later.

In the optical information recording medium 10, the recording layers 12 and the resin layers 13 stacked alternately above the guide track layer 11 constitute a recording layer stack M11, and the recording layers 12 and the resin layers 13 stacked alternately below the guide track layer 11 constitute a recording layer stack M12. Also, the guide track layer 11, the recording layer stack M11, and the recording layer stack M12 constitute a multilayer unit U1.

The optical information recording medium 10 of the first embodiment may include the cover layer 14, one or more multilayer units U1 on the cover layer 14, and the substrate layer 19 on the multilayer units U1.

The substrate layer 19 protects the recording layer 12 on the top of the multilayer units U1 from a physical impact and thereby protects information recorded on the recording layer 12.

The optical information recording medium 10 shown in FIG. 1 includes one multilayer unit U1 on the cover layer 14.

Figure 2A:
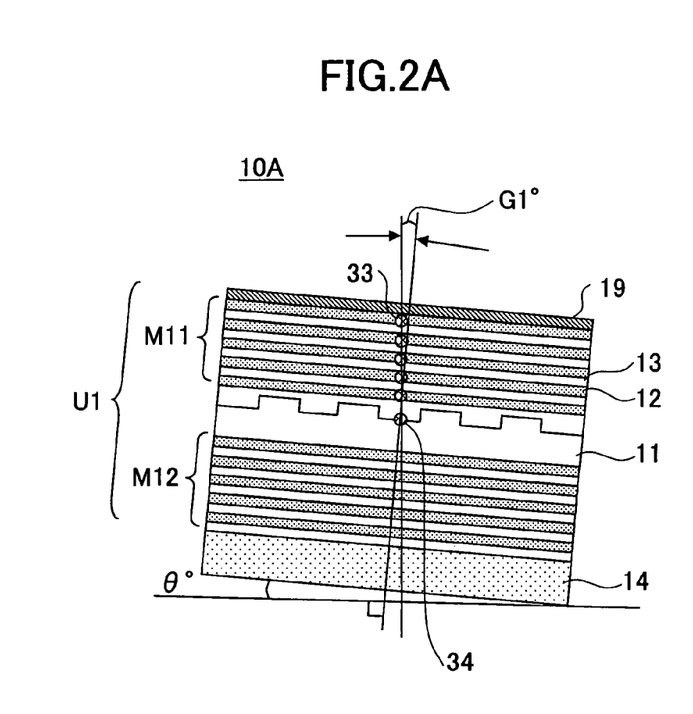
FIGS. 2A and 2B are drawings used to describe positional shifts of pits caused when optical information recording media of the first embodiment and a comparative example are tilted.
Figure 2B:
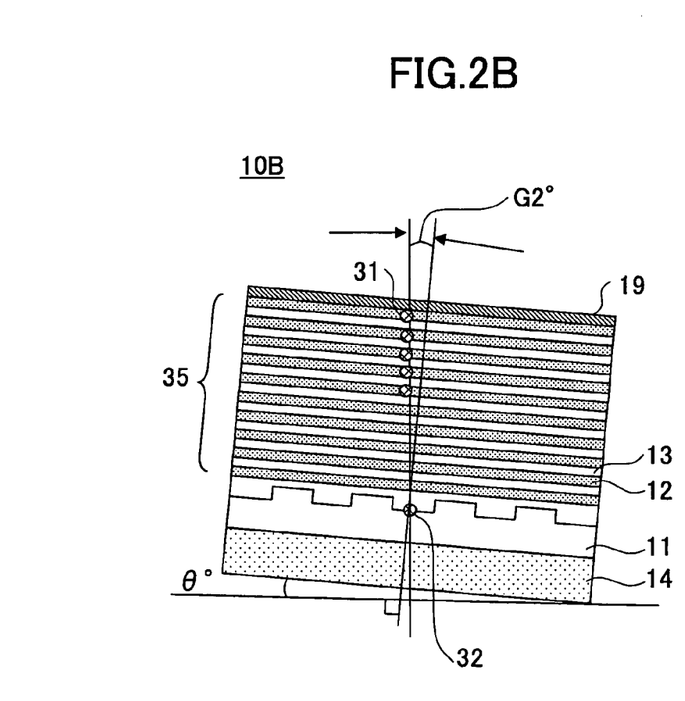

FIGS. 2A and 2B are drawings used to describe positional shifts of pits caused when optical information recording media of the first embodiment and a comparative example are tilted.

FIG. 2A shows an optical information recording medium 10A according to the first embodiment where the recording layers 12 are provided both above and below the guide track layer 11. As shown in FIG. 2A, the optical information recording medium 10A includes one multilayer unit U1 on the cover layer 14.

FIG. 2B shows an optical information recording medium 10B provided as a comparative example where the recording layers 12 are provided only above the guide track layer 11. As shown in FIG. 2B, the optical information recording medium 10B includes the cover layer 14, the guide track layer 11 on the cover layer 14, a recording layer stack 35 composed of the recording layers 12 and the resin layers 13 stacked alternately on the guide track layer 11, and the substrate layer 19 on the recording layer stack 35.

Each of the optical information recording media 10A and 10B includes ten recording layers 12.

When the optical information recording medium 10B is tilted θ° with respect to the horizontal plane, a pit 31 on the uppermost recording layer 12 of the recording layer stack 35 is shifted with respect to a corresponding pit 32 on the guide track layer 11 by G2° that is the product of the thickness of the recording layer stack 35 and the tangent of θ (tan θ). When the optical information recording medium 10A is tilted θ° with respect to the horizontal plane, a pit 33 on the uppermost recording layer 12 of the recording layer stack M11 is shifted with respect to a corresponding pit 34 on the guide track layer 11 by G1° that is the product of the thickness of the recording layer stack M11 and the tangent of θ (tan θ). Since the thickness of the recording layer stack M11 is one half of that of the recording layer stack 35, G1° becomes one half of G2°. Therefore, information can be stably recorded/reproduced on/from the optical information recording medium 10A even when it is warped. Thus, the first embodiment makes it possible to provide a highly-reliable optical information recording medium.

Figure 3:
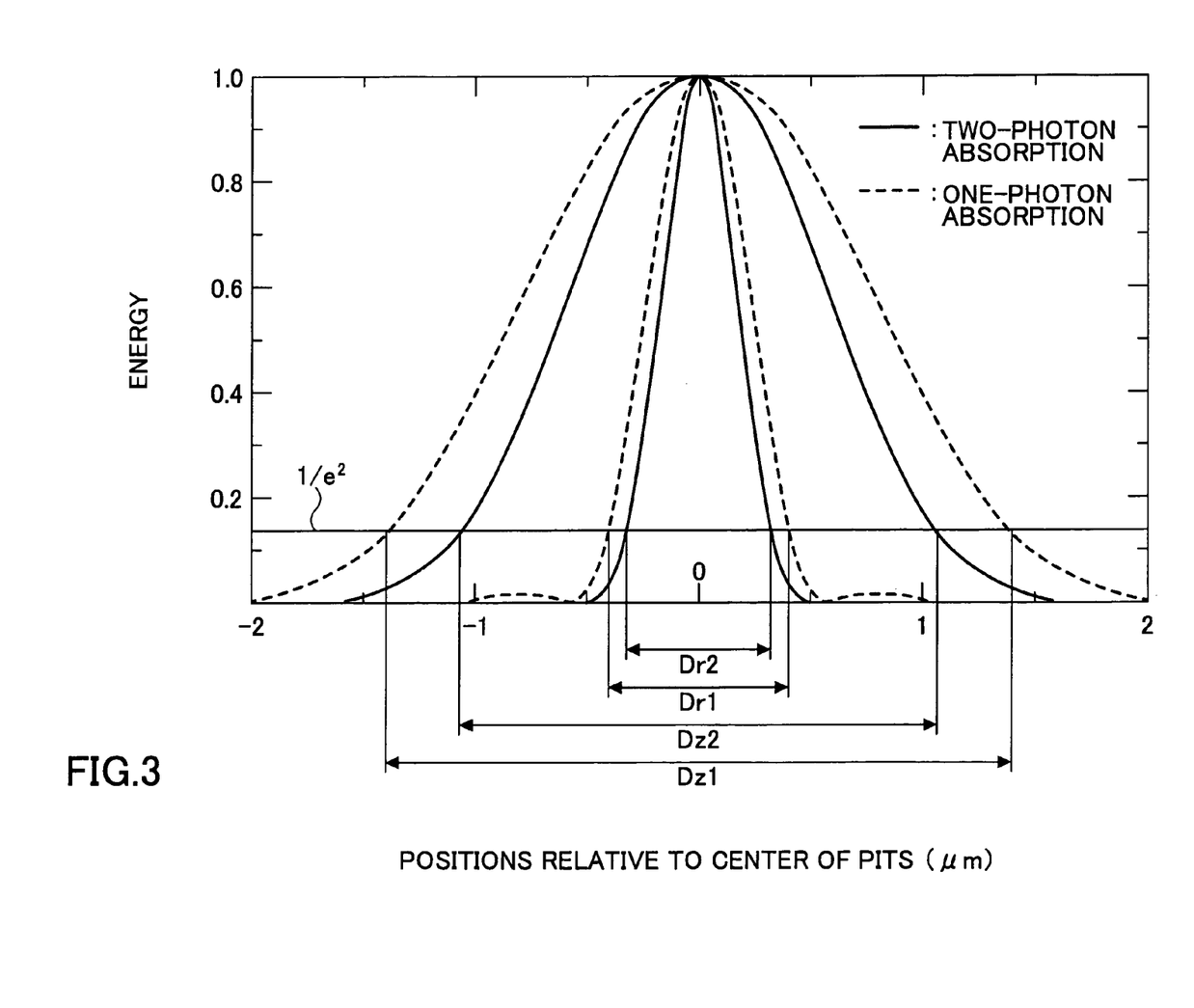
FIG. 3 is a graph showing difference in size of pits on a two-photon absorption material and a conventional material.

FIG. 3 is a graph showing difference in size of pits on a two-photon absorption material and a conventional material (the graph is quoted from "Two-photon absorption recording on photochromic material using laser diode", Teruhiro Shiono, OPTRONICS, July 2005, No. 283, p 174, published by the Optronics Co., Ltd.).

In FIG. 3, the horizontal axis indicates positions relative to the center of pits and the vertical axis indicates energy that the photon-absorption material has received at corresponding positions. Dz2 and Dr2 indicate the length and width of a pit recorded by two-photon absorption, and Dz1 and Dr1 indicate the length and width of a pit recorded by one-photon absorption.

When the recording layers 12 are composed of a two-photon absorption material, information is recorded in a photon mode. Examples of two-photon absorption materials include photorefractive materials, photopolymers, and photochromic materials. In photon-mode recording, the refractive index of an area exposed to a light spot changes in proportion to the light intensity distribution of the light spot and a pit is formed as the result of the change in refractive index. Therefore, the size of a pit formed by photon-mode recording is about $0.71(=1/\sqrt{2})$ times as large as that of a pit formed by normal recording. For example, as shown in FIG. 3, a pit recorded by two-photon absorption is smaller than a pit recorded by normal one-photon absorption. Thus, when the wavelengths of light sources used for two-photon absorption recording and one-photon absorption recording are the same, two-photon absorption recording makes it possible to record information at a recording density higher than that achievable by one-photon absorption recording. In other words, using a two-photon absorption material for the recording layers 12 makes it possible to increase the storage capacity of an optical information recording medium.

Figure 4:
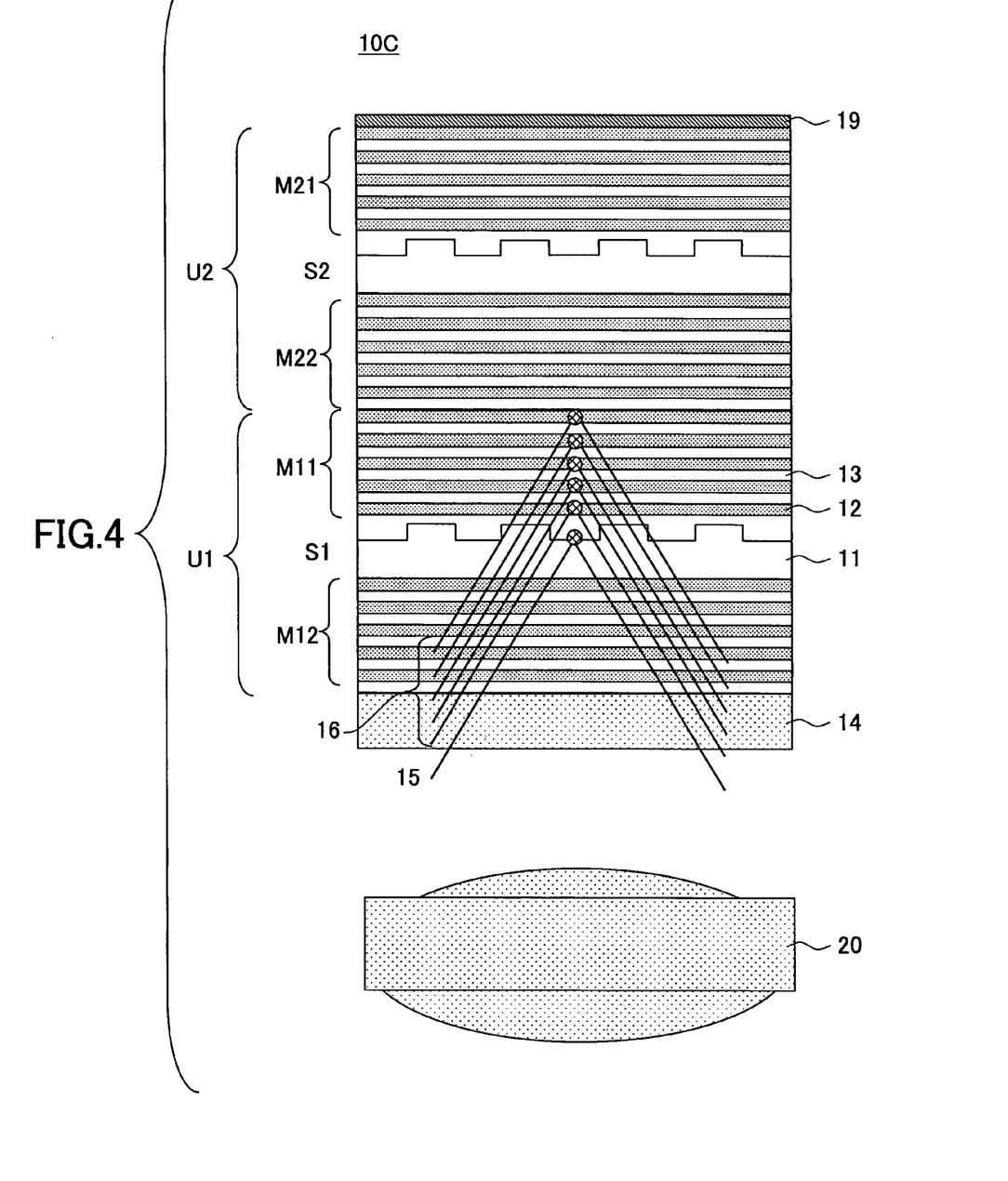
FIG. 4 is a drawing used to describe an exemplary process of recording/reproducing information on an optical information recording medium according to a variation of the first embodiment.
Figure 5:
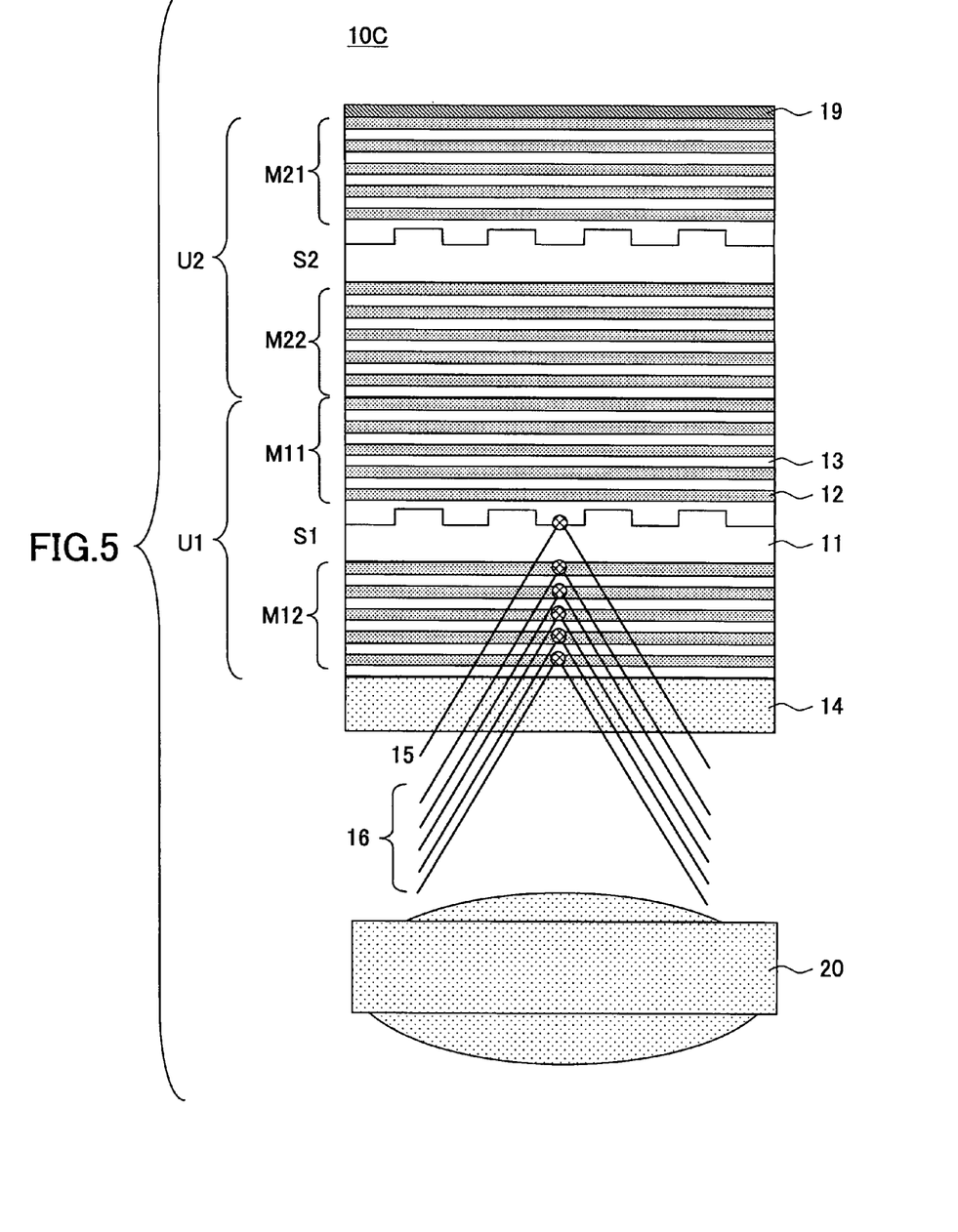
FIG. 5 is a drawing used to describe another exemplary process of recording/reproducing information on the optical information recording medium according to the variation of the first embodiment.

FIGS. 4 and 5 are drawings used to describe exemplary processes of recording/reproducing information on an optical information recording medium according to a variation of the first embodiment. An optical information recording medium 10C shown in FIGS. 4 and 5 is a variation of the optical information recording medium 10 and includes two multilayer units U1 and U2 stacked on the cover layer 14 (the multilayer unit U2 has the same configuration as that of the multilayer unit U1). An objective lens 20 is also shown in FIGS. 4 and 5.

In FIG. 4, information is being recorded or reproduced on/from the upper recording layer stack M11 of the multilayer unit U1 using a guide track layer S1 for servo control. In this exemplary information recording/reproduction process, a servo beam 15 from the objective lens 20 is focused on the guide track layer S1 and recording/reproducing beams 16 from the objective lens 20 are focused on the recording layers 12 of the recording layer stack M11. The servo beam 15 is used to perform servo control including focusing and tracking. After the servo control, information is recorded or reproduced on/from target tracks on the recording layers 12 of the recording layer stack M11 by using the recording/reproducing beams 16.

In FIG. 5, information is being recorded or reproduced on/from the lower recording layer stack M12 of the multilayer unit U1 after information is recorded or reproduced on/from the recording layer stack M11. The servo beam 15 is still focused on the same position on the guide track layer S1 as that shown in FIG. 4 and information is recorded or reproduced by moving the recording/reproducing beams 16 to the corresponding positions on the recording layers 12 of the recording layer stack M12. Since there is no need to move the servo beam 15 from the guide track layer S1, access time needed to record or reproduce information on the recording layer stack M12 can be reduced.

The optical recording material for the recording layers 12 preferably contains a two-photon absorption material. The recording layers 12 of this embodiment are composed of an optical recording material used for DVDs. A two-photon absorption material normally has a low sensitivity and the wavelengths within its absorption band are longer than the wavelength of blue light. In other words, to cause two-photon absorption, a high-power light source with a long wavelength is required. Therefore, a red-light laser diode used for DVDs and having a wavelength between 650 and 680 nm is preferable as the light source of the recording/reproducing beams 16.

In this embodiment, the guide track layer 11 contains no two-photon absorption material and is composed of a material used in Blu-ray disks and HD-DVDs. To form small pits on the guide track layer 11, a light beam having a wavelength shorter than that of the recording/reproducing beams 16 is preferably used as the servo beam 15. Since the size of a pit is proportional to "wavelength/NA of lens", the size of a pit can be reduced by using a light beam with a shorter wavelength. Reducing the size of pits to be formed on the guide track layer 11 makes it possible to increase the track density and thereby to increase the storage capacity of the optical information recording medium 10.

For the above reason, a laser diode having a wavelength between 390 and 420 nm is preferable as a light source of the servo beam 15. Conventional processing techniques are available to produce optical information recording media for which a light beam having the above wavelength can be used to obtain stable servo signals. Using conventional processing techniques in turn makes it possible to reduce the production costs.

Alternatively, a light beam having a wavelength between 650 and 680 nm may be used as the servo beam 15 and a light beam having a wavelength between 770 and 880 nm may be used as the recording/reproducing beam 16. Light beams having the above wavelengths can be easily obtained by using laser diodes. Also, small and high-power laser diodes having the above wavelengths are widely used for CDs and DVDs and therefore are available at low costs. Examples of recording materials that react to a light beam having a wavelength in a range between about 770 nm and about 800 nm include dye compounds such as rhodamine and coumalin, dithienothiophene derivatives, and oligophenylenevinylene derivatives. It is known that information can be recorded on recording layers composed of such recording materials by two-photon absorption using a femtosecond pulse laser.

The guide track layer 11 may also be composed of an optical recording material. Using an optical recording material for the guide track layer 11 makes it possible to further increase the storage capacity of the optical information recording medium 10. The guide track layer 11 composed of an optical recording material may be used to record, for example, security data, update logs, and optimum recording conditions and other information on corresponding recording layers. Also, the guide track layer 11 may be configured to conform to the Blu-ray standard.

Further, information may be prerecorded on the guide track layer 11. For example, a unit number may be prerecorded on the guide track layer 11 as its identification information. As another example, information on the recording layer stacks M11 and M12, for which servo control is performed using the guide track layer 11, may be recorded on the guide track layer 11. This configuration makes it possible to easily identify locations of information recorded on the optical information recording medium 10 and thereby to reduce access time. As still another example, a read-only program such as an information security management program may be recorded on the guide track layer 11.

The optical information recording medium 10C as shown in FIG. 5 may be produced as described below. First, the guide track layer 11 and the recording layer stacks M11 and M12 each composed of alternately stacked recording layers 12 and resin layers 13 are prepared. Next, the recording layer stacks M11 and M12 are bonded to the corresponding sides of the guide track layer 11. One or more multilayer units U1 are prepared through the steps described above. The multilayer units U1 are stacked on the cover layer 14 and bonded. Then, the substrate layer 19 is bonded onto the uppermost multilayer unit U1.

Compared with the configuration disclosed in patent document 1 where recording layers are provided only on one side of a guide track layer, the configuration according to the first embodiment makes it possible to reduce the average distance between recording layers and a guide track layer and thereby to reliably record or reproduce information even when an optical information recording medium is tilted. Accordingly, the configuration according to the first embodiment reduces the possibility that the servo beam 15 intended to be focused on the guide track layer 11 is mistakenly focused on the recording layers 12. This in turn prevents degradation of the recording layers 12 composed of a two-photon absorption material that is susceptible to blue light and ultraviolet light and thereby makes it possible to reliably record and reproduce information.

Also, compared with the configuration disclosed in patent document 2 where a first guide track layer and a second guide track layer are provided, respectively, above and below a set of recording layers, the configuration according to the first embodiment makes it possible to reduce the number of guide track layers. In other words, with the configuration of the first embodiment, one of the first and second guide track layers in the optical information recording medium disclosed in patent document 2 can be replaced with a recording layer(s) to increase the storage capacity. Also, reducing the number of the guide track layers 11 makes it possible to reduce the number of times the servo beam 15 is moved from one guide track layer 11 to another and thereby to reduce the access time. In other words, with an optical information recording medium according to the first embodiment, even large amounts of data can be quickly recorded or reproduced.

Second Embodiment

Figure 6:
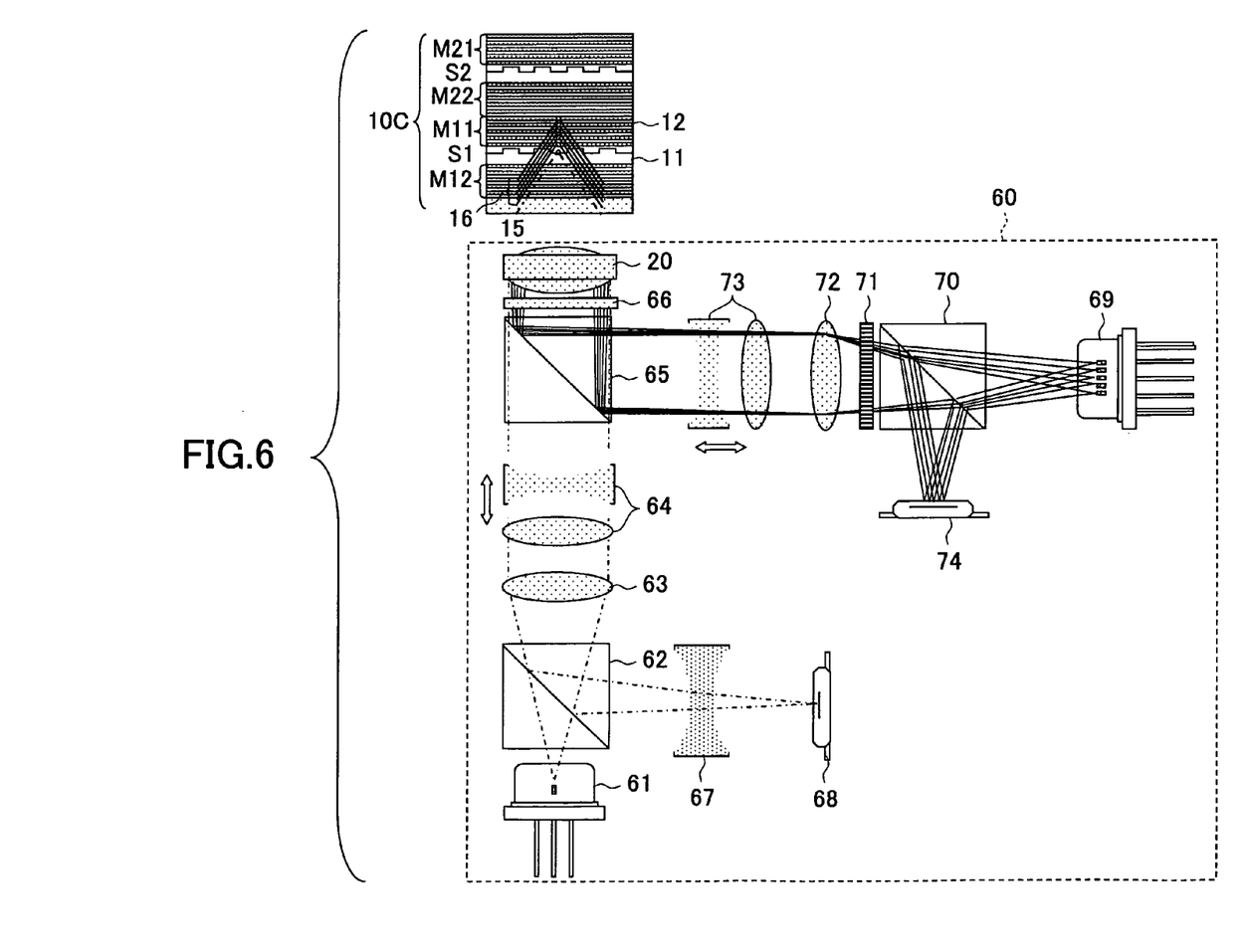
FIG. 6 is a drawing illustrating an optical information recording/reproducing system according to a second embodiment of the present invention.

FIG. 6 is a drawing illustrating an optical information recording/reproducing system according to a second embodiment of the present invention. The optical information recording medium 10C is also shown in FIG. 6.

As shown in FIG. 6, an optical information recording/reproducing system 60 includes a first light source 61, a polarization beam splitter 62, a collimator lens 63, a first spherical aberration correcting unit 64, a beam splitter 65, a ¼ wavelength plate 66, an objective lens 20, a detection lens 67, a servo beam receiving element 68 (a first photodetector), a second light source 69, a polarization beam splitter 70, an optical element 71 (hologram), a collimator lens 72, a second spherical aberration correcting unit 73, and a recording/reproducing beam receiving element 74 (a second photodetector).

The optical information recording/reproducing system 60 is configured to record or reproduce information on the recording layers 12 of the optical information recording medium 10C using the servo beam 15 and the recording/reproducing beams 16.

The optical paths of the servo beam 15 and the recording/reproducing beams 16 in the optical information recording/reproducing system 60 are described below.

The first light source 61 emits the servo beam 15. The first light source 61 is preferably a laser diode that emits a laser beam having a wavelength between 390 and 420 nm.

The servo beam 15 passes through the polarization beam splitter 62, the collimator lens 63, the first spherical aberration correcting unit 64, the beam splitter 65, and the ¼ wavelength plate 66, and is focused by the objective lens 20 on the guide track layer S1 of the optical information recording medium 10C. The objective lens 20 is equipped with a driving mechanism (including a focusing actuator and a tracking actuator). The driving mechanism moves the objective lens 20 so that the servo beam 15 is focused on the guide track layer S1.

The servo beam 15 is reflected by the guide track layer S1 back to the polarization beam splitter 62, reflected by the polarization beam splitter 62 into the detection lens 67, and enters the servo beam receiving element 68. The servo beam receiving element 68 generates servo signals such as a focusing signal and a tracking signal based on the received servo beam 15. Descriptions of servo signals are given later.

The recording/reproducing beams 16 are described below. The second light source 69 emits the recording/reproducing beams 16. The second light source 69 is preferably a laser diode array that emits red laser beams having a wavelength between 650 and 680 nm. The recording/reproducing beams 16 emitted from the second light source 69 pass through the polarization beam splitter 70 and are diffracted by the optical element 71 such that their optical axes come together and their divergence angles become different (see, for example, International Symposium on Optical Memory 2000, Fr-PD-15, Lee. S. C. and Kawata, Shizuoka Univ.). The recording/reproducing beams 16 are then substantially collimated by the collimator lens 72. However, since the recording/reproducing beams 16 have different divergence angles, they become a mixture of collimated light beams, divergent light beams, and convergent light beams. The recording/reproducing beams 16 pass through the second spherical aberration correcting unit 73, the beam splitter 65, and the ¼ wavelength plate 66, and are focused by the objective lens 20 on the recording layers 12 of the recording layer stack M11 of the optical information recording medium 10C.

As the second light source 69, a set of separate laser diodes may be used instead of a laser diode array. Light beams from laser diodes can be diffracted by using a stack of holograms such that their optical axes come together and their divergence angles become different. With the stack of holograms optimally designed according to the light-emitting points of laser diodes, it is possible to achieve a diffraction efficiency higher than that achievable with one hologram.

The recording/reproducing beams 16 focused on the recording layers 12 of the recording layer stack M11 are reflected back to the polarization beam splitter 70 via the optical element 71 and further reflected by the polarization splitter 70 into the recording/reproducing beam receiving element 74. The recording/reproducing beam receiving element 74 receives multiple recording/reproducing beams 16 reflected from the recording layer stack M11 and detects signals from the recording layers 12 of the recording layer stack M11 at once. Thus, the optical information recording/reproducing system 60 is configured to record or reproduce information on multiple recording layers 12 at once and therefore can record or reproduce information at high speed.

A Si-PIN photodiode with a wide dynamic range is preferable as the servo beam receiving element 68 and an avalanche photodiode (APD) with a high multiplication factor is preferable as the recording/reproducing beam receiving element 74. An avalanche photodiode can amplify weak signals from the recording layers 12 having a low reflectance. On the other hand, a Si-PIN photodiode can accurately detect a servo signal that requires linearity.

The first spherical aberration correcting unit 64 and the second spherical aberration correcting unit 73 are described below with reference to FIG. 6.

The optical information recording medium 10C includes multiple guide track layers 11. Accordingly, the distance the servo beam 15 travels within the optical information recording medium 10C differs depending on the position of a guide track layer 11 on which the servo beam 15 is to be focused. This difference in travel distance causes spherical aberration. The first spherical aberration correcting unit 64 corrects the spherical aberration of the servo beam 15 caused by the difference in travel distance. The first spherical aberration correcting unit 64 is movable stepwise according to the position of a target guide track layer 11 in the optical information recording medium 10C. For example, when the servo beam 15 is moved from the guide track layer S1 to the guide track layer S2, the objective lens 20 is moved upward in FIG. 6 by the driving mechanism. At the same time, since the travel distance of the servo beam 15 within the optical information recording medium 10C changes, the first spherical aberration correcting unit 64 is moved to correct spherical aberration caused by the change in travel distance. Thus, to accurately focus the servo beam 15 on multiple guide track layers 11 (S1 and S2) of the optical information recording medium 10C, it is necessary to move the first spherical aberration correcting unit 64 in addition to the objective lens 20.

The optical information recording medium 10C includes multiple recording layer stacks M11, M12, M21, and M22. Accordingly, the distance the recording/reproducing beams 16 travel within the optical information recording medium 10C differs depending on the position of a target recording layer stack. This difference in travel distance causes spherical aberration. The second spherical aberration correcting unit 73 corrects the spherical aberration caused by the difference in travel distance of the recording/reproducing beams 16. Thus, to accurately focus the recording/reproducing beams 16 on the recording layer stacks M11, M12, M21, and M22 of the optical information recording medium 10C, it is necessary to move the second spherical aberration correcting unit 73 in addition to the objective lens 20.

As described above, the second embodiment provides an optical information recording/reproducing system that can accurately record or reproduce information on an optical information recording medium of the first embodiment at high speed. In the second embodiment, the servo beam receiving element 68 and the recording/reproducing beam receiving element 74 are provided separately. This configuration makes it possible to use photodetectors most suitable for their respective roles, i.e., a low-speed photodetector for the servo beam 15 and a high-speed photodetector for the recording/reproducing beams 16. Also, since the servo beam 15 with the same intensity can be used both in information recording and reproduction, it is not necessary to provide a gain switch for the servo beam receiving element 68. This in turn makes it possible to simplify the circuit configuration of the servo beam receiving element 68.

Figure 7:
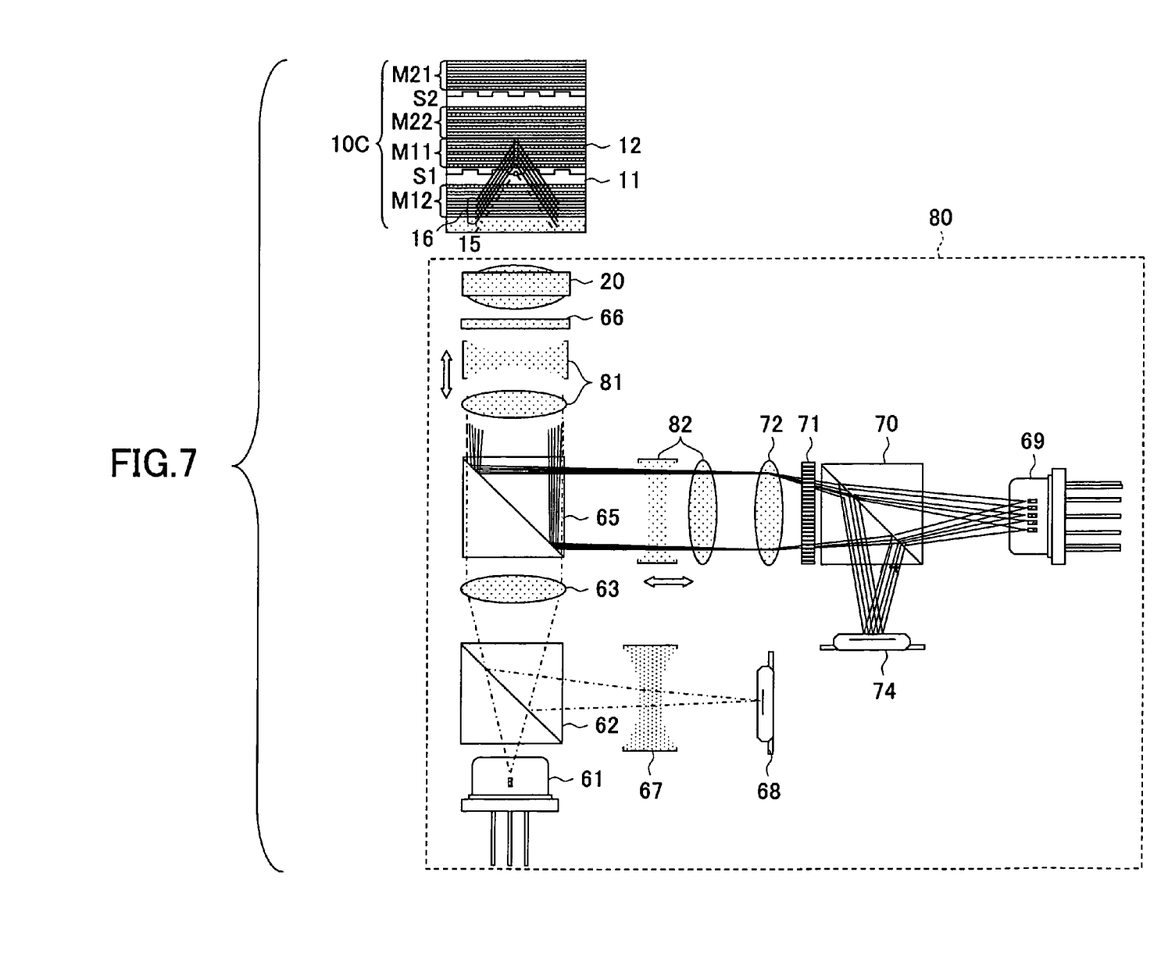
FIG. 7 is a drawing illustrating an optical information recording/reproducing system according to a variation of the second embodiment.

FIG. 7 is a drawing illustrating an optical information recording/reproducing system according to a variation of the second embodiment. In FIG. 7, the same reference numbers are used for parts corresponding to those shown in FIG. 6, and descriptions of those parts are omitted.

As shown in FIG. 7, an optical information recording/reproducing system 80 includes a first light source 61, a polarization beam splitter 62, a collimator lens 63, a first spherical aberration correcting unit 81, a beam splitter 65, a ¼ wavelength plate 66, an objective lens 20, a detection lens 67, a servo beam receiving element 68, a second light source 69, a polarization beam splitter 70, an optical element 71, a collimator lens 72, a second spherical aberration correcting unit 82, and a recording/reproducing beam receiving element 74.

In the optical information recording/reproducing system 60 shown in FIG. 6, the first spherical aberration correcting unit 64 is positioned between the collimator lens 63 and the beam splitter 65. Therefore, only the servo beam 15 passes through the first spherical aberration correcting unit 64. On the other hand, in the optical information recording/reproducing system 80 shown in FIG. 7, the first spherical aberration correcting unit 81 is positioned between the beam splitter 65 and the ¼ wavelength plate 66. Therefore, in this case, both the servo beam 15 and the recording/reproducing beams 16 pass through the first spherical aberration correcting unit 81.

In the optical information recording/reproducing system 60, the first spherical aberration correcting unit 64 and the second spherical aberration correcting unit 73 work independently to correct the spherical aberration of the servo beam 15 and the recording/reproducing beams 16. With the configuration shown in FIG. 7, the second spherical aberration correcting unit 82 may be used solely to correct spherical aberration caused when the recording/reproducing beams 16 are moved from the recording layer stack M11 above the guide track layer S1 to the recording layer stack M12 below the guide track layer S1 (or vice versa).

Thus, in the optical information recording/reproducing system 80, the first spherical aberration correcting unit 81 is used to correct spherical aberration of both the servo beam 15 and the recording/reproducing beams 16, and the second spherical aberration correcting unit 82 is used only to correct spherical aberration caused when the recording/reproducing beams 16 are moved between the recording layer stack M11 and the recording layer stack M12 (or between M21 and M22). The amount of spherical aberration caused when the recording/reproducing beams 16 are moved between the recording layer stack M11 and the recording layer stack M12 (or between M21 and M22) is constant. Therefore, the configuration of the second spherical aberration correcting unit 82 shown in FIG. 7 can be made simpler than that of the second spherical aberration correcting unit 73 shown in FIG. 6.

Thus, the variation of the second embodiment makes it possible to simplify the configuration of the second spherical aberration correcting unit 82 and thereby to reduce the size of the optical information recording/reproducing system 80.

Third Embodiment

Figure 8:
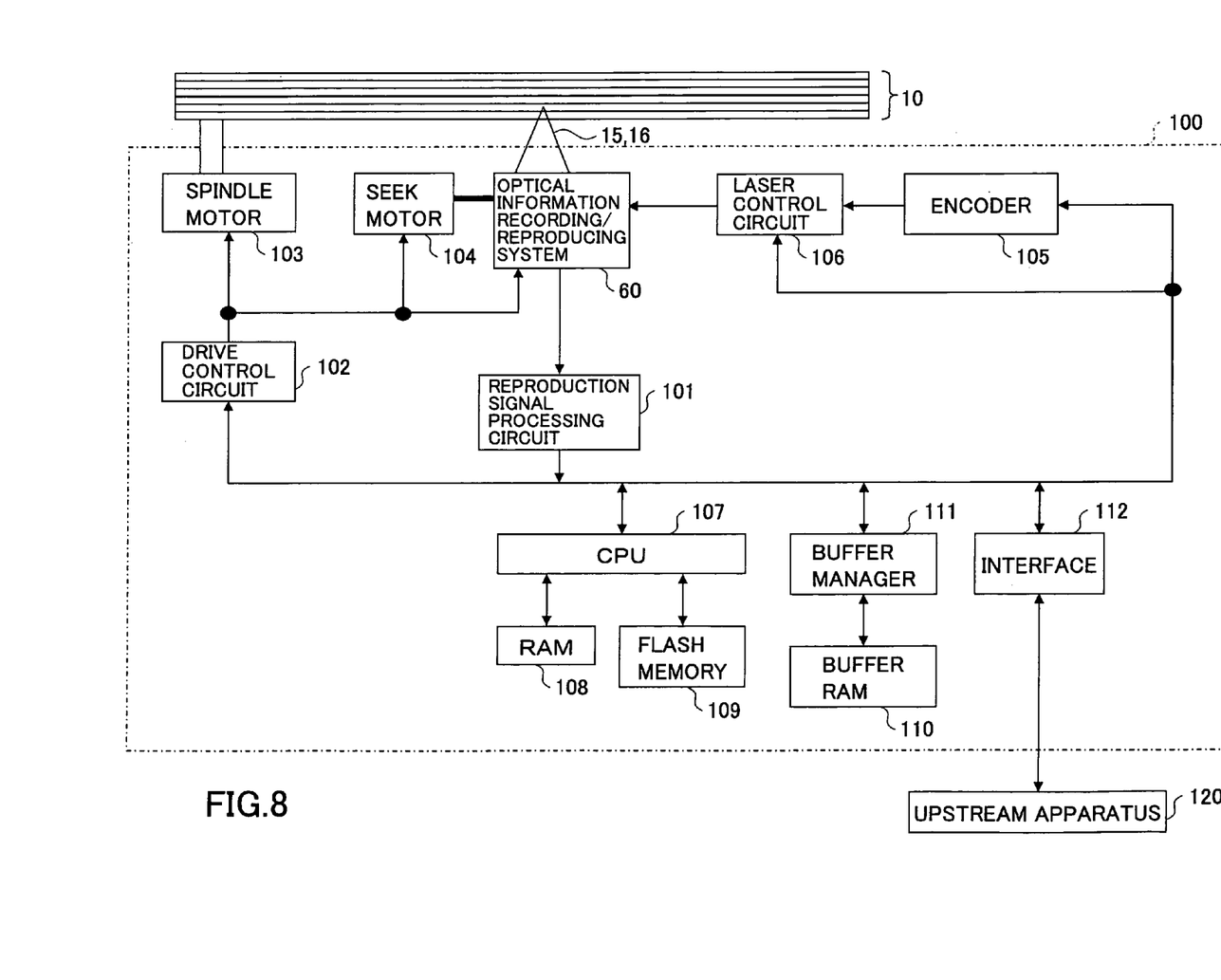
FIG. 8 is a block diagram illustrating a configuration of an optical information recording/reproducing apparatus according to a third embodiment of the present invention.

FIG. 8 is a block diagram illustrating a configuration of an optical information recording/reproducing apparatus according to a third embodiment of the present invention. As shown in FIG. 8, an optical information recording/reproducing apparatus 100 includes the optical information recording/reproducing system 60, a reproduction signal processing circuit 101, a drive control circuit 102, a spindle motor 103, a seek motor 104, an encoder 105, a laser control circuit 106, a CPU 107, a RAM 108, a flash memory 109, a buffer RAM 110, a buffer manager 111, and an interface 112.

The optical information recording/reproducing apparatus 100 can reliably record or reproduce information on the optical information recording medium 10 (or 10C) having a large storage capacity at high speed even when the optical information recording medium 10 is tilted.

In the optical information recording/reproducing apparatus 100, signals from the servo beam receiving element 68 and the recording/reproducing beam receiving element 74 are sent to the reproduction signal processing circuit 101. From the received signals, the reproduction signal processing circuit 101 obtains, for example, servo signals, such as a focusing error signal and a tracking error signal, address information, a synchronization signal, and an RF signal. Then, the reproduction signal processing circuit 101 sends the servo signals to the drive control circuit 102, the address information to the CPU 107, and the synchronization signal to the encoder 105 and the drive control circuit 102. Further, the reproduction signal processing circuit 101 performs decoding and error detection on the RF signal and if no error is found, stores the RF signal as reproduced data via the buffer manager 111 in the buffer RAM 110. When an error is detected in the RF signal, the reproduction signal processing circuit 101 performs error correction before storing the RF signal in the buffer RAM 110. Meanwhile, address information contained in the reproduced data is sent to the CPU 107.

Based on the tracking error signal from the reproduction signal processing circuit 101, the drive control circuit 102 generates a driving signal for driving the tracking actuator to correct the positional shift regarding the tracking direction of the objective lens 20. Also, based on the focusing error signal from the reproduction signal processing circuit 101, the drive control circuit 102 generates a driving signal for driving the focusing actuator to correct the focusing error of the objective lens 20. The generated driving signals are sent to the optical information recording/reproducing system 60. The optical information recording/reproducing system 60 performs tracking control and focus control according to the driving signals. Further, the drive control circuit 102 generates a driving signal for driving the seek motor 104 and a driving signal for driving the spindle motor 103 according to instructions from the CPU 107. The generated driving signals are sent to the seek motor 104 and the spindle motor 103.

The buffer RAM 110 temporarily stores, for example, data (recording data) to be recorded on the optical information recording medium 10 and data (reproduced data) reproduced from the optical information recording medium 10. Data input/output to or from the buffer RAM 110 is controlled by the buffer manager 111.

The encoder 105, according to an instruction from the CPU 107, retrieves recording data stored in the buffer RAM 110 via the buffer manager 111. Then, the encoder 105 modulates the retrieved recording data, attaches error-correcting code to the modulated recording data, and thereby generates a recording signal for recording information on the optical information recording medium 10. The generated recording signal is sent to the laser control circuit 106.

The laser control circuit 106 controls the laser power of light sources. For example, when recording information, the laser control circuit 106 generates driving signals for driving light sources based on the recording signal, recording conditions, and light-emitting properties of laser diodes. In this embodiment, the laser control circuit 106 controls the laser power of the first light source 61 for emitting the servo beam 15 and the second light source 69 for emitting the recording/reproducing beams 16.

The interface 112 enables two-way communications between the optical information recording/reproducing apparatus 100 and an upstream apparatus 120 such as a personal computer. The interface 112 is a standard interface such as an AT attachment packet interface (ATAPI), a small computer system interface (SCSI), or a universal serial bus (USB).

The flash memory 109 stores, for example, programs written in codes that the CPU 117 can understand, recording conditions including recording power and recording strategies, and light-emitting properties of laser diodes.

The CPU 107 controls other units in the optical information recording/reproducing apparatus 100 according to the programs stored in the flash memory 109 and stores data for controlling the other units in the RAM 108 and the buffer RAM 110.

Figure 9:
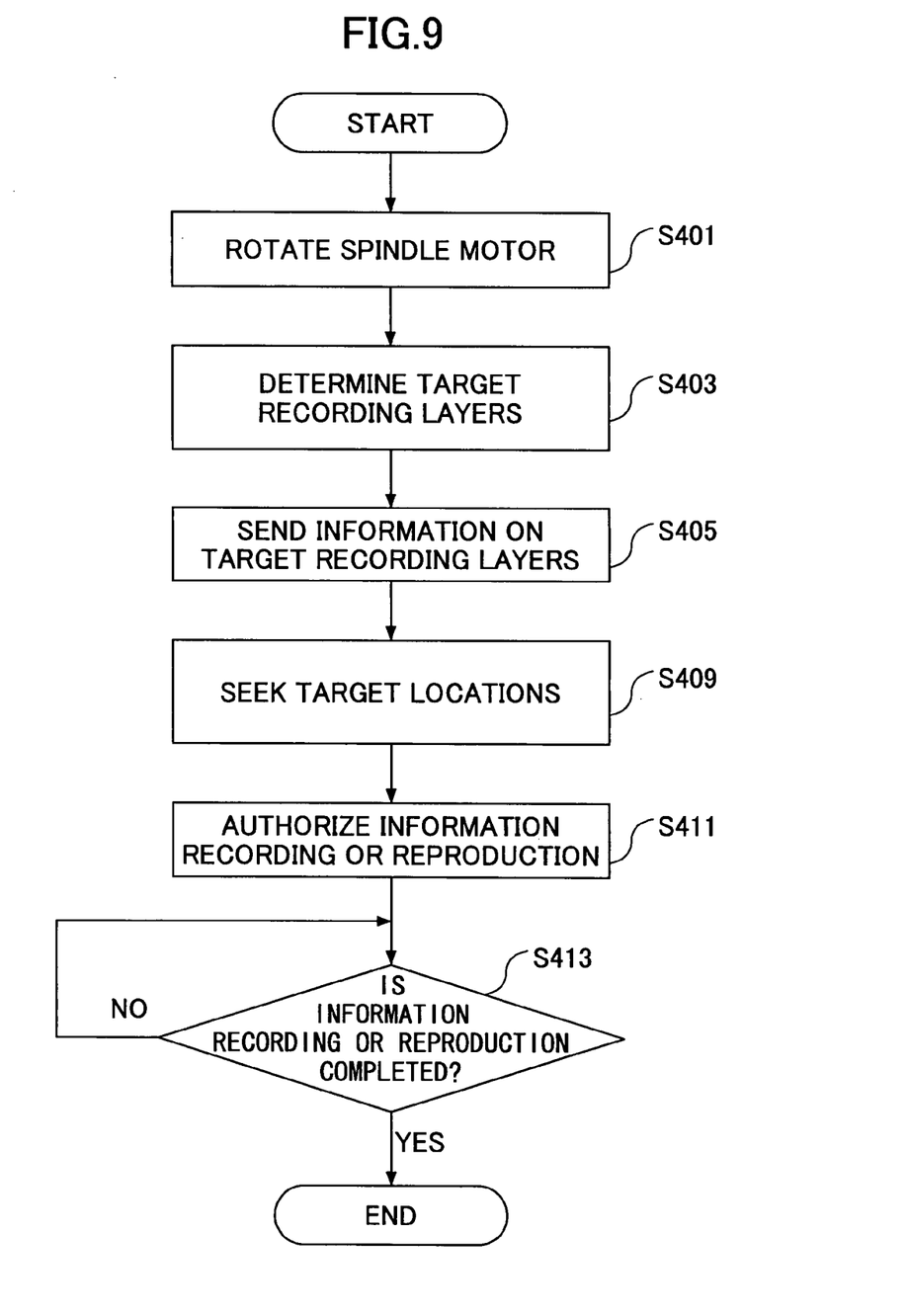
FIG. 9 is a flowchart showing an exemplary recording/reproduction process performed by the exemplary optical information recording/reproducing apparatus of the third embodiment when a recording/reproduction request is received from an upstream apparatus.

FIG. 9 is a flowchart showing an exemplary recording/reproduction process performed by the optical information recording/reproducing apparatus 100 when a recording/reproduction request is received from the upstream apparatus 120. Steps in the flowchart shown in FIG. 9 correspond to a set of processing algorithms in a program executed by the CPU 107.

When a recording request or a reproduction request (hereafter just called a request) is received from the upstream apparatus 120, the initial address of a program corresponding to the flowchart shown in FIG. 9 is set in the program counter of the CPU 107 and a recording/reproduction process is started.

The CPU 107 causes the drive control circuit 102 to rotate the spindle motor 103 (i.e. the optical information recording medium 10) at a specified linear velocity (or angular velocity) and reports the reception of the request from the upstream apparatus 120 to the reproduction signal processing circuit 101 (S401).

Then, the CPU 107 extracts target addresses from the request and determines target recording layers 12 based on the target addresses (S403).

Next, the CPU 107 sends information regarding the target recording layers 12 to the drive control circuit 102 (S405).

Also, the CPU 107 causes the drive control circuit 102 to seek locations on the target recording layers 12 and the guide track layer 11 corresponding to the target addresses (S409). If a seek operation is not necessary, this step is skipped.

The CPU 107 authorizes recording or reproduction of information (S411).

Then, the CPU 107 determines whether the recording or reproduction of information is completed (S413). If the recording or reproduction of information is not completed, the CPU 107 performs this step again after a specified period of time. If the recording or reproduction of information is completed, the recording/reproduction process is terminated.

In the exemplary recording/reproduction process above, the reproduction signal processing circuit 101, the CPU 107, and the program executed by the CPU 107 constitute a process control unit. However, a part or all of the process performed by the CPU 107 according to the program may be implemented by hardware.

Thus, the third embodiment provides the optical information recording/reproducing apparatus 100 that records or reproduces information on the optical information recording medium 10 or 10C of the first embodiment using the optical information recording/reproducing system 60 or 80 of the second embodiment. The optical information recording/reproducing apparatus 100 can reliably record or reproduce information on the optical information recording medium 10 or 10C even when the optical information recording medium 10 or 10C is tilted because of, for example, vibration.

An embodiment of the present invention provides an optical information recording medium where positions of tracks on multiple recording layers can be accurately determined using one guide track layer even when the optical information recording medium is tilted.

Embodiments of the present invention provide an optical information recording/reproducing system and an optical information recording/reproducing apparatus that can accurately record or reproduce information on an optical information recording medium according to an embodiment of the present invention at high speed.

The present invention is not limited to the specifically disclosed embodiments, and variations and modifications may be made without departing from the scope of the present invention.

The present application is based on Japanese Priority Application No. 2006-190560, filed on Jul. 11, 2006, the entire contents of which are hereby incorporated herein by reference.

What is claimed is:

1. An optical information recording medium, comprising:
   a guide track layer having grooves and ridges formed thereon; and
   a plurality of recording layers composed of an optical recording material and disposed above and below the guide track layer,
   wherein the guide track layer is used to determine track positions on one or more of the plurality of recording layers, and
   wherein the optical recording material is a two-photon absorption material.

2. The optical information recording medium as claimed in claim 1, comprising:
   a plurality of said guide track layers and a respective plurality of said recording layers; and
   a plurality of multilayer units stacked one on another, each of the multilayer units including one of the plurality of guide track layers and the respective plurality of recording layers.

3. The optical information recording medium as claimed in claim 1, wherein the guide track layer contains an optical recording material and information is recordable on the guide track layer.

4. The optical information recording medium as claimed in claim 1, wherein information is prerecorded on the guide track layer.

5. An optical information recording/reproducing system for recording and/or reproducing information on the optical information recording medium as claimed in claim 1, comprising:
   a first light source configured to emit a first light beam to be focused on the guide track layer;
   a second light source configured to emit a second light beam to be focused on any one of the recording layers;
   a first spherical aberration correcting unit configured to correct spherical aberration of the first light beam;
   a second spherical aberration correcting unit configured to correct spherical aberration of the second light beam;
   an objective lens configured to focus the first light beam on the guide track layer and to focus the second light beam on the any one of the recording layers;
   a beam splitter configured to separate the first light beam reflected from the guide track layer and the second light beam reflected from the any one of the recording layers;
   a first photodetector configured to receive the first light beam reflected from the guide track layer; and
   a second photodetector configured to receive the second light beam reflected from the any one of the recording layers.

6. The optical information recording/reproducing system as claimed in claim 5, wherein
   the first spherical aberration correcting unit is positioned between the beam splitter and the objective lens and configured to correct the spherical aberration of the first and second light beams; and
   the second spherical aberration correcting unit is configured to correct only the spherical aberration of the second light beam.

7. The optical information recording/reproducing system as claimed in claim 5, wherein a wavelength of the first light beam is shorter than that of the second light beam.

8. An optical information recording/reproducing apparatus including the optical information recording/reproducing system as claimed in claim 5.

9. The optical information recording medium as claimed in claim 1, wherein the guide track layer is used to determine track positions on one or more of the plurality of recording layers disposed above the guide track layer and on one or more of the plurality of recording layers disposed below the guide track layer.

* * * * *